United States Patent
Vernon

(10) Patent No.: US 12,489,978 B2
(45) Date of Patent: Dec. 2, 2025

(54) 360 VR-PPP

(71) Applicant: Kevin Vernon, Hamilton (CA)

(72) Inventor: Kevin Vernon, Hamilton (CA)

(73) Assignee: Kevin Vernon, Hamilton (CA)

( * ) Notice: Subject to any disclaimer, the term of this patent is extended or adjusted under 35 U.S.C. 154(b) by 155 days.

(21) Appl. No.: 18/445,645

(22) Filed: Dec. 11, 2023

(65) Prior Publication Data
US 2024/0292106 A1    Aug. 29, 2024

(51) Int. Cl.
H04N 23/698    (2023.01)
G02B 27/00     (2006.01)
G02B 27/01     (2006.01)

(52) U.S. Cl.
CPC ....... *H04N 23/698* (2023.01); *G02B 27/0093* (2013.01); *G02B 27/017* (2013.01); *G02B 2027/0138* (2013.01)

(58) Field of Classification Search
None
See application file for complete search history.

(56) References Cited

U.S. PATENT DOCUMENTS

| | | | | |
|---|---|---|---|---|
| 2008/0043108 A1* | 2/2008 | Jung | ................. | H04N 23/667 |
| | | | | 386/E5.072 |
| 2009/0096929 A1* | 4/2009 | Silberstein | ............. | H04N 5/262 |
| | | | | 348/E5.056 |
| 2017/0228930 A1* | 8/2017 | Seif | ................... | H04L 65/1063 |

FOREIGN PATENT DOCUMENTS

CN    114802790    *   7/2022

* cited by examiner

*Primary Examiner* — Eileen M Adams

(57) ABSTRACT

This invention entitled process of configuring a 360 degree continuous pan virtual reality camera system is in the field of technology. It is a process comprising said invention managing a camera device wherein said invention manages the shutter speed of the camera lens to act at 1/7920s or greater and said invention rotates said camera device 360 degrees panning continuously every 1 second or less and capturing 22 fps or more upon fulfilling a 360 degree rotation, creating 1 viable video feed for every 1 degree increment of a 360 degree rotation. Said invention further comprising the utilization of a virtual reality headset wherein said invention configures said virtual reality headset enabling said headset to perform the functions of a television studio switcher console. Said invention solves the problem of requiring only 1 camera lens to configure virtual reality as opposed multiple cameras.

2 Claims, 2 Drawing Sheets

PROCESS OF CONFIGURING A 360 DEGREE CONTINUOUS PAN VIRTUAL REALITY CAMERA SYSTEM

PROCESS OF CONFIGURING A 360 DEGREE CONTINUOUS
PAN VIRTUAL REALITY CAMERA SYSTEM

PROCESS OF CONFIGURING A 360 DEGREE CONTINUOUS
PAN VIRTUAL REALITY CAMERA SYSTEM

360 VR-PPP

BACKGROUND OF THE INVENTION

This invention entitled process of configuring a 360 degree continuous pan virtual reality camera system is in the field of technology. This invention relates to virtual reality cameras. This software application will facilitate a single lens camera machine with a CPU and memory to rotate 360 degrees panoramic continually panning with a shutter speed capable of 1/7920s and higher to render video of 22 FPS or more. This application solves the premise that was first introduced in CIPO Patent application; Socket Camera #3108490, Socket Camera APP #3171316. USPTO Patent applications, USPTO Socket Camera #Ser. No. 17/304,668 and USPTO Socket Camera application Ser. No. 17/803,662. It also solves the problem of the necessity of having multiple cameras in an array in order to achieve a virtual reality capture.

The prior art related to the present patent application would be Canadian Patent application 301976 entitled THREE DIMENSIONAL, 360-DEGREE VIRTUAL REALITY CAMERA SYSTEM. Hereafter, the aforementioned invention may be referred to as A1. The Abstract for A1 reads as follows:

ABSTRACT—A camera system is configured to capture 360 degree image information of a local area, at least a portion of which is in stereo. The camera system includes a plurality of peripheral cameras, a plurality of axis cameras, a first rigid plate, and a second rigid plate, each aligned along an alignment axis. The peripheral cameras are arranged in a ring configuration that allows objects in the local area past a threshold distance to be within the fields of view of at least two peripheral cameras. The first and second rigid plates secure to a top and a bottom surface of the ring of peripheral cameras, respectively. At least one axis camera is arranged along the alignment axis and is coupled perpendicularly to a surface of the first rigid plate. The field of invention could not be distinguished in on-line records but the title of the invention in itself declared the field of invention.

Some of the claims for invention A1 are as follows: CLAIMS—CLAIMS What is claimed is: 1. A camera system comprising: a plurality of peripheral cameras, the peripheral cameras arranged in a ring configuration around a centre point such that an optical axis of each camera is within a plane and a field of view of each camera faces away from the centre point, and that outside of a threshold distance any object in a portion of a local area is within a field of view of at least two peripheral cameras; at least one axis camera positioned such that an optical axis of the at least one axis camera is along an alignment axis that runs through the centre point;

a first rigid plate positioned along the alignment axis such that the alignment axis bisects a centre of the first plate, the first rigid plate including a first top surface and a first bottom surface, the first top surface coupled to a first mounting surface of the at least one axis camera, the first bottom surface coupled to first mounting surfaces of the plurality of peripheral cameras; and a second rigid plate positioned along the alignment axis such that the alignment axis bisects the centre of the second plate, the second rigid plate including a second top surface coupled to second mounting surfaces of the plurality of peripheral cameras.

2. The camera system of claim 1, wherein the first plate and the second plate are disk-shaped. 3. The camera system of claim 1, further comprising a bottom axis camera that is positioned such that an optical axis of the bottom axis camera is along the alignment axis that runs through the centre point, and the centre point is between the top axis camera and the bottom axis camera.

It would be superfluous and uneconomical to delve and search into the description of A1 as it is ostensibly clear from the Abstract and root claims that there is no similitude between the invention of A1 and the present patent application.

This invention entitled process of configuring a 360 degree continuous pan virtual reality camera system is in the field of technology. Specifically virtual reality cameras. As technology advances so does the need for innovation. Advancements in camera technology has always been a leading trend. From better resolution, to where and how cameras and video can be used. The present invention is the embodiment of software that promotes the advancement of camera and video technology. This software encompasses an improvement and ease of technology.

A user will no longer need a plurality of cameras to achieve a true virtual reality render. The background art relating to this invention was that it was assumed that any and all virtual reality cameras required more than one camera in order to capture and render a virtual reality video. This invention proves this is not so. This invention is also more cost effective. To have 1 high quality lens as opposed to 10 or more high quality lenses. This software utilizes some video stitching components but brings that technology to a higher and better usefulness. It is a new process and is a technological improvement.

BRIEF SUMMARY OF THE INVENTION

This invention entitled process of configuring a 360 degree continuous pan virtual reality camera system is in the field of technology. This invention is a process of configuring a 360 degree continuous pan virtual reality camera system wherein the new process and improvement comprises a physical memory having stored thereon the present invention as machine executable code managing the electronic processes within a camera machine and computer machine or source device.

The process comprising the steps of said invention managing the electronic processes of the shutter speed of the camera lens to act at 1/7920s or faster and said invention managing the electronic processes of a camera machine which shall be rotated under its own power, if said camera machine is unable to rotate continuously under its own power it shall be connected to a mechanism to enable it to do so, thus allowing rotation of said camera machine to rotate 360 degrees panning continuously every 1 second or less until being required to stop, said machine shall be any machine with 1 or more camera lenses and have a CPU and sufficient memory to operate this software if said machine does not have a CPU and sufficient memory it shall be a peripheral of a machine that does; with a shutter speed as such and a rotation speed as such the camera machine shall capture 22 fps or more upon fulfilling a 360 degree rotation, such is a process that is creating 1 viable video feed for every 1 degree increment of a 360 degree rotation.

This process further comprising the utilization of a virtual reality headset wherein the present invention stored thereon a physical memory as machine executable code manages the electronic processes of said virtual reality headset configuring said virtual reality headset to perform the functions of a television studio switcher, said television studio switcher functions would include a variety of video transitions and hybrid combinations of said video transitions that would be initiated when any user dons said virtual reality headset wherein electronic processes are being configured by said invention, said video transitions would be initiated at the moment said user moves their head.

BRIEF DESCRIPTION OF THE DRAWINGS

Some embodiment of the presented invention are illustrated as an example and are not limited by the figures of the accompanying drawings.

DETAILED DESCRIPTION OF THE INVENTION

Figure 1:
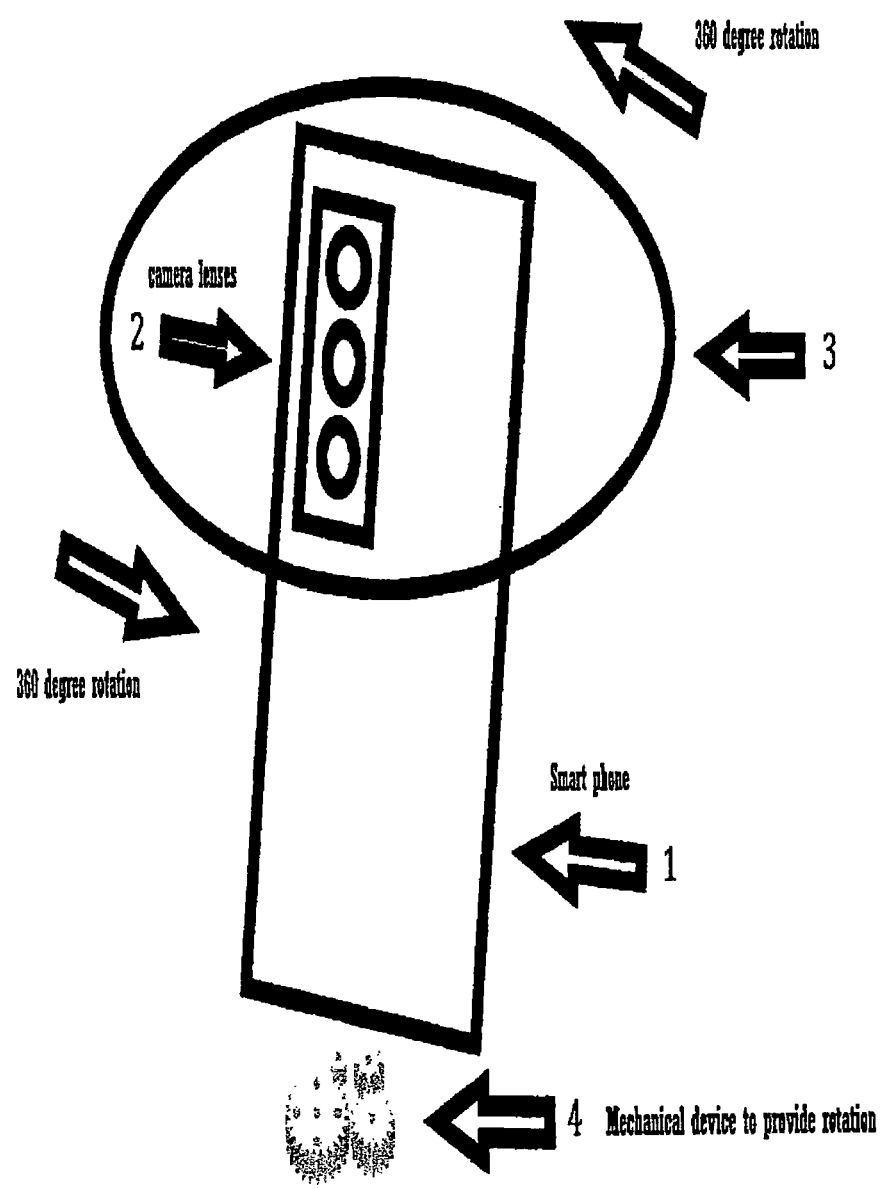
FIG. 1. Is a representation of the source device in which the present Invention software has been installed. In this diagram it is a smartphone or any camera machine. This diagram indicates that the source device must be in continual rotation.
1. is the source device in which the software has been installed upon.
2. is a series of camera lenses.
3. is a circle which is a representation of the continual 360 degree rotation.
4. are gears as an indication that a smart phone or camera machine would require an external device that could provide the required rotation.

This invention entitled process of configuring a 360 degree continuous pan virtual reality camera system is in the field of technology. This software is a process of configuring a 360 degree continuous pan virtual reality camera system wherein the new process and improvement comprises a physical memory having stored thereon the present invention as machine executable code managing the electronic processes within a camera machine and computer machine or source device, the process comprising the steps of said invention managing the electronic processes of the shutter speed of the camera lens to act at 1/7920s or greater and said invention managing the electronic processes of a camera machine which shall be rotated under its own power, if said camera machine is unable to rotate continuously under its own power it shall be connected to a mechanism to enable it to do so, thus allowing rotation of said camera machine to rotate 360 degrees panning continuously every 1 second or less until being required to stop, said machine shall be any machine with 1 or more camera lenses and have a CPU and sufficient memory to operate this software if said machine does not have a CPU and sufficient memory it shall be a peripheral of a machine that does; with a shutter speed as such and a rotation speed as such the camera machine shall capture 22 fps or more upon fulfilling a 360 degree rotation, such is a process that is creating 1 viable video feed for every 1 degree increment of a 360 degree rotation.

This process further comprising the utilization of a virtual reality headset wherein the present invention stored thereon a physical memory as machine executable code manages the electronic processes of said virtual reality headset configuring said virtual reality headset to perform the functions of a television studio switcher, said television studio switcher functions would include a variety of video transitions and hybrid combinations of said video transitions that would be initiated when any user dons said virtual reality headset wherein electronic processes are being configured by said invention, said video transitions would be initiated at the moment said user moves their head.

To aid in the concepts of what shall make this software functional, some background is to be given on the terminology. According to Wikipedia, a forum where definitions are submitted and widely accepted by the general public; Image stitching or photo stitching is the process of combining multiple photographic images and video with overlapping fields of view to produce a segmented panorama or high resolution image. Commonly performed through the use of computer software, most approaches to image stitching require nearly exact overlaps between images and identical exposures to produce seamless results.

The image stitching process can be divided into three main components: image registration, calibration, and blending. Social media platform TIK TOK boasts that the user is able to stitch their media with that of other users to create very smooth video transitions in making their own videos.

As the videos that are captured by the present invention are intended to be view whilst donning a VR headset. One must take into consideration that when the user is turning their head left or right, the view finder in the virtual reality headset must show the appropriate images to the wearer as they turn their head. This is when video scrubbing shall be implemented.

Video scrubbing is a technique used in video editing to manually move across a number of sequential video frames. In the editing process the user moves a cursor across the footage frame by frame. This software will implement this movement without a cursor. As the user turns their head left or right this software will scrub across video frames smoothly until the head movement of the user stops at which point the captured video will begin to play again. This process will later be expounded in the description. This passage is intended only to familiarize the reader with video stitching and video scrubbing.

Another process in which background must be given is that of a television studio video switcher. When one is watching a Hockey, Basketball or football game. They are watching a high quality live studio production and process. 40 or more cameras with live video feeds may be in operation simultaneously. The switcher console is the unit that receives all of the video feeds and organizes the feeds.

The director, observing all 40 cameras will issue commands to the switcher operator to transition from camera to camera using cut/takes, wipes, dissolves, super imposition etc to give the viewer at home an enhanced viewing experience of a live sporting event. The present invention will utilize the principles of a television control room switcher unit enabling the switching of recorded video feeds for an enhanced user experience. This software shall be equipped with all the capabilities and effects of a television switcher unit at its disposal.

Since this inventive software has the capability of rendering usable video at every 1 degree increment of the 360 degree continuous rotation it is possible for this software to have 360 video feeds of viable footage. Currently shutter speeds are as fast as 1/8000s and will be getting ever faster with the advancement of technology. This software shall be implemented on a camera machine or a smart phone such as an I phone which has a shutter speed capable of 1/8000s. Provided that the smartphone could be secured to a tripod device that will give it continuous rotation.

The formula for the present invention is as such. With the shutter speed commanded to act at 1/7920s and rotate 360 degrees continually every 1 second. This will allow the CPU to collect 22 FPS at every 1 degree increment of 360 degrees. If the software commands a higher rotation speed, for example a full 360 degree rotation in 0.50 seconds the CPU will still collect 22 FPS but after 2 complete rotations. The higher rotation speed will mitigate any loss of capture of quicker movements in the vicinity of the camera.

With the shutter speed at 1/7920s, the command can still be issued for an even faster 360 degree rotation. The human eye needs only 15 FPS to recognize a subject as being in motion. So 22 FPS is an adequate capture speed to render usable video. As a reference, original motion picture film was shot at 24 fps. As this software can capture 22 Frames at every 1 degree increment of 360 degrees, this software can start to create 360 individual video feeds because every 1 degree increment will fulfill its frame capture rate after a rotation cycle in 1 second of a 360 degree rotation.

As an example, this software is reminiscent of a toy that one may have had as a child. The toy was in the shape of a megaphone. It had a view finder, a crank and you would insert a cartridge with still frames. The faster that you turned the crank you would eventually get a subject in motion from all the frames going by. This phenomenon is known as Persistence of vision, or retinal persistence. This occurs because of an attribute of human sight. An optical of illusion of continuity is created because an image, more concisely the reflected light from a subject may remain on our retinas for 1/30 of a second. Depending on how bright the reflected light is bouncing off of the subject. This is why this software shall put the lens in continuous motion.

At any one degree increment of the 360 degrees; when the lens is rotating in a complete circle in 1 second or less, the software shall capture the subject at 22 FPS repeatedly and continually at that 1 degree increment until the subject leaves the field of view. Fast enough motion, with increments of movement appear as a moving subject to the human eye.

It is like having a thick novel and in the top corner of the page is a stick man. If a tiny transition of movement is given to the stick figure and you turn the pages quickly with your thumb it will put the stick figure in motion. Or like in stop motion animation. The artist would take a still photo of the clay subject. The artist would go move the subject slightly and repeat this action until the subject completes a full movement. Then simply plays the compiled frames quickly and the clay figure comes to life. This is Persistence of vision. This is another aspect and reason why the continuous rotation at a high speed is necessary. Combined with the subject being captured at 22 FPS on every 1 degree increment of a 360 degree rotation produces fluid movement enhanced with persistence of vision.

It would be superfluous to render 360 videos as this would be taxing on the CPU and memory but this option is not ruled out. For the sake of preserving memory and giving an easier task to the CPU. This software will use the same format of organizing captured video as a still image panoramic 360 degree capture would use. It is to be appreciated that this software will not be operating in real time. The watchable video will not be available until all video has been rendered.

When creating a panoramic photo of still images, usually 36 images are necessary with the images captured being 10 degrees apart. So as an example for this software every 10 degrees of the 360 degrees that have been captured this software will start to produce a video feed but the user could select 360, 18, 9 or 4 video feeds. The amount of video feeds shall remain optional to the user. 36 video feeds will be used as an example at every 10 degrees. As there will be a mark/position or video feed every 10 degrees of 360 degrees this will allow for 36 video feeds to be created by the software.

36 videos are now available after processing and saving. These 36 video feeds shall be available to the user to stitch and edit in post production and create virtual reality movies for their pleasure or for business purposes that can be viewed in a virtual reality headset, TV, monitor or smart device. This software shall implement capabilities so that when the user is donning a virtual reality headset they shall be able to watch the captured footage in virtual reality in the headset. The sensors in the virtual reality head set that create the virtual reality effect can detect when the user turns their head left or right and shall display the corresponding movement in the viewfinder of the virtual reality headset.

On a smart device, the user shall be able to swipe their finger to activate panning or control the functions of the software such as start stop, on/off etc. When touch screen is not available. The user can use a keyboard or mouse to activate panning and other control functions such as start stop, on/off etc.

As the user can only turn their head left or right; in this purpose. As this edition of the patent application software facilitates continuous panning of a single lens camera. In the future this software may be upgraded to facilitate a plurality of cameras in a camera array in which case the availability of viable video feeds would increase exponentially. In continuation of the single lens application. When the user turns their head left or right the software need only to stitch adjacent videos to each other sequentially as the lens is only panning left or right. As it is the same lens, all the videos are already synced in all facets. To aid in the transitions of adjacent video in case of a rapid head turn. The software has the ability to trigger a video editing scrub. Whereas the software would only need to display adjacent frames in the direction of the head turning and the quick motion of the head turn will be the motion that is needed to let the human eye perceive movement which is enhance by retinal persistence.

Like the earlier analogy of the novel with the stick man in the upper corner. This software will utilize Persistence of vision or retinal persistence. For the purpose of example we were explaining a 36 video feed similar to the 36 shot panoramic photographic render. With the video feeds in this case being 10 degrees apart. When the user is wearing the virtual reality headset and turns their head to the right the sensors in the virtual reality headset will recognized that the user is turning their head to the right. When this occurs the software has to introduce a transition like that of a television studio switcher. The most common transition that this software shall utilize would be that of a video wipe but the transition could be a hybrid of transitions. A wipe with super imposition and fade.

A wipe is a video transition whereas the new video that is being introduced pushes the existing video on screen to the other side of the screen until it is gone. Leaving only the new video. So both videos shall share the screen for a duration. This wipe would have no border so you will not be able to see where one video feed ends and the next one begins. This wipe would utilize Persistence of vision. With a video imposition, the software shall make adjustments for the 10 degree difference. There are also usable frames in between the 10 degree difference the software can utilize. Again, retinal persistence. The video is almost doing a transition of a wipe into to same picture composition as it is only 10 degrees offset. The software shall make a 10 degree adjustment stitch in transition simultaneously with a wipe transition.

As an example, If there were a tree on the right side of the video feed and the user turns their head to the right. As these videos would already be in sync because they were captured by the same lens. The software could detect the colour variances of the picture composition or recognize texts and patterns similar to facial recognition and text recognition. It would align the tree with the incoming video feed of the tree that would move to the left side of the video feed. This could be done within a few frames until the wipe transition has been completed.

If this invention is to be developed by person or persons skilled in the art whom are ready to develop a prototype in alpha or beta. They must be made aware of a requirement to produce the invention. The present invention is a machine executable application expressed in lines of code that shall send data and give commands by means of electronic processes configured by a source device. A source device shall be any machine with 1 or more camera lenses. The source device shall have a CPU and sufficient memory to operate this invention. If the source device does not have a CPU and sufficient memory to operate this invention it shall be a peripheral of a machine that does.

This invention shall command the lens of said machine to operate and capture images with a shutter speed of 1/7920s or faster. This invention shall command said camera machine to rotate 360 degrees continuously panning in 1 second or less. If said camera machine is unable to rotate continuously panning in 1 second or less under its own power it shall be connected to a mechanism that shall enable it to do so. It is inferred that a person or persons skilled in the art having average intelligence would undertake enabling said machine to rotate and fulfill the requirements of the present invention predicated upon the disclosure of the description, claims, abstract and diagrams. Though, the idea of a camera machine able to meet the requirements of this specification is novel, as none yet exist. The general configuration of said camera machine may be left to different interpretations. These are the instructions of the disclosure.

This invention shall enable any camera machine with a CPU and sufficient memory capable of operating this invention to capture 22 fps after every 360 degree rotation. Said camera machine configured by said invention expressed as lines of code shall create 1 viable video feed for every 1 degree increment of a 360 degree rotation. As said camera machine is instructed to have a CPU and memory and is considered a computer, it is to be appreciated and reasonably inferred that this machine with a CPU and memory shall have an interface with controls befitting a device of its own nature, as with all computers. For example, general functions are to be made available to control the machine. Functions such as on/off, start/stop, record/capture. General functions that will effectively operate the machine so as the machine can perform its duties of a camera machine. As this is indeed a camera machine as disclosed in the specification and diagrams, it would be common general knowledge to equip it with said functions.

Once this software has been developed, the simplistic method of distribution would be DTC 'direct to consumer' as DLC 'downloadable content' which would be made available for smart devices/machines that meet the requirements. The DLC would be provided in the APP store platform or direct from a website. This software could also be modestly packaged in a cardboard sleeve and distributed by a retailer which would then be purchased by the consumer and they would be provided with an activation key. The consumer would then download or install this software on their computer, machine or smart device. Once this software has been installed on their device the utilization of the software will become available to them.

DETAILED DESCRIPTION OF THE DRAWINGS

FIG. 1. Is a representation of a smartphone or machine that has the present invention installed. This software would enable such a device to capture 360 degree virtual reality videos provided that this machine is mounted to a mechanism that is able to rotate it 360 degrees continuously, completing a rotation cycle in 1 second or less. This software will set the shutter speed to 1/7920 or faster allowing the machine to capture 22 fps every 1 degree increment of the 360 degrees rotation.

1. As indicated in FIG. 1 is the source device. The source device would be any such device as stated in the diagram description of FIG. 1. The source device is the CPU and computing interface that the present invention has been installed or downloaded to. On this device the user will be able to view captured footage and perform all of the functions and features of the present invention. This App will provide features such as a video editor, video capturing, video switcher capabilities. This source device will provide the interface for the virtual reality headset and controller system to interact with the software.

2. As indicated in FIG. 1 are the camera lenses. This software shall command the rolling shutter to capture images at a shutter speed of 1/7920s or faster. With the shutter speed set at 1/7920s the camera shall capture footage at 22 FPS for processing.

3. As indicated in FIG. 1 is depicted a circle that is the indication that the machine must be rotated continuously 360 degrees. It shall be a continuously, panning, panoramic capture.

4. As indicated in FIG. 1 gives explicit indication that a smartphone or a machine that can not rotate itself must employ an exterior mechanism that will provide the continuous rotation.

Figure 2:
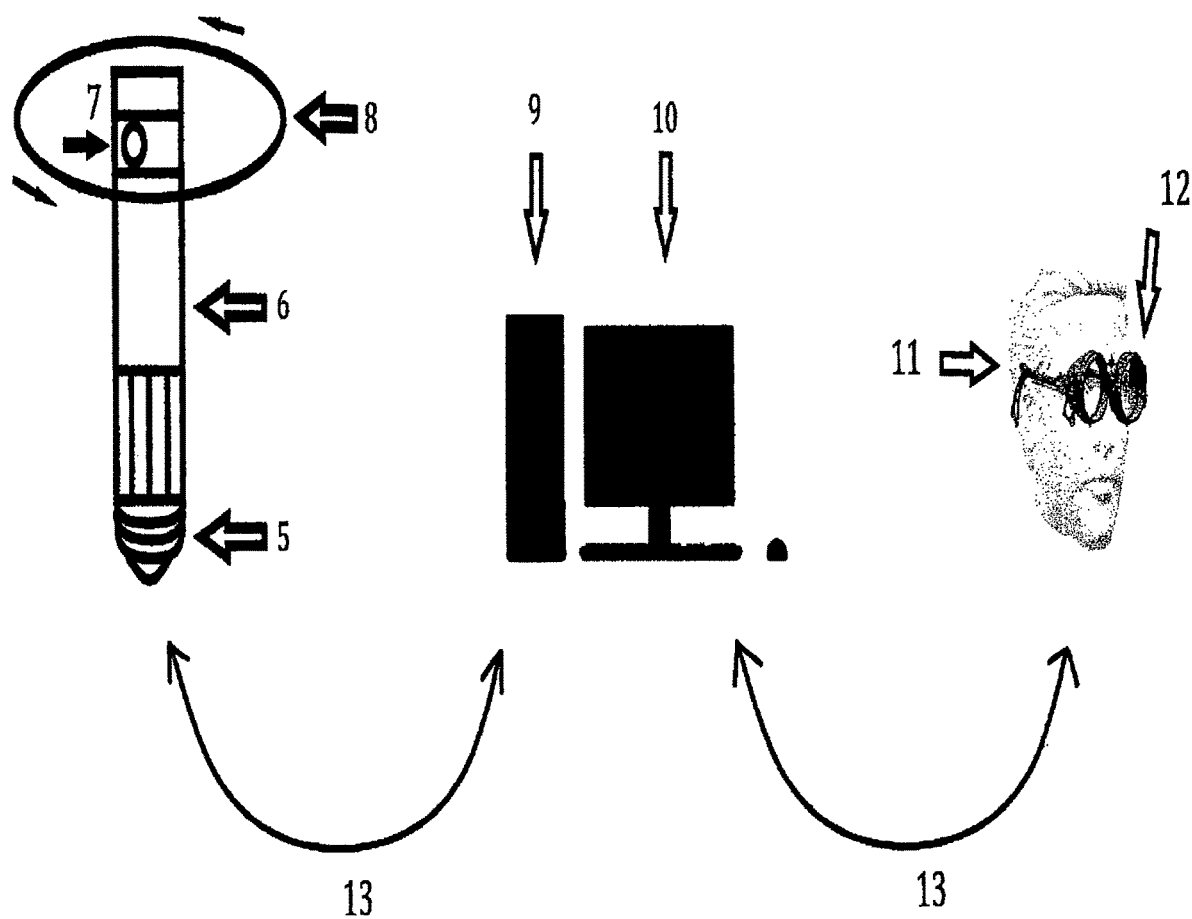
FIG. 2. is a representation of the software installed to a computer machine working with the peripherals. Which are any suitable camera machine in conjunction with a virtual reality headset.
5. is a screwed threading to secure and mount the camera machine.
6. is a camera machine equipped to rotate 360 degrees continuously in 1 second or less under its own power.
7. is a high quality lens.
8. is a circle which is a representation of the continual 360 degree rotation.
9. is the computer CPU and hard drives with the present invention software installed upon.
10. is the computer monitor.
11. is the user.
12. is the virtual reality headset worn by the user.
13. is the direction of data flow.

10. As indicated in FIG. 2 is the computer monitor. If the user elects not to use the virtual reality headset they can interface with the monitor and interact and give tasks to the software to perform.

11. As indicated in FIG. 2 is the user. The individual interacting with the software.

12. As indicated in FIG. 2 is the virtual reality headset interface. The user shall don the virtual reality headset. The headset shall enable the viewing of all the captured footage in virtual reality. The sensors in the virtual reality headset that create the virtual reality effect can distinguish when the user is turning their head left or right. As such, the software will send the corresponding video to the virtual reality headset of panning left or right. This will immerse the wearer of the virtual reality headset in a virtual reality experience. This software shall implement aspects of video stitching, video switching and video scrubbing to achieve this.

13. As indicated in FIG. 2 is the flow and process of data delivery and sequence.

DESCRIPTION OF THE PREFERRED EMBODIMENTS

Let it be recognized some possible set ups and uses of this invention idea. This software can be utilized on a smartphone by any member of the general public professional or novice alike, to create high quality panoramic virtual reality video. A big advancement in technology from simply taking a panoramic photo. Using a distortion free lens, captures will be more realistic enhancing the viewer experience. Editing software. Audio and Video will be available as a upgraded second tier offering and the user will be able to shoot and edit high quality true virtual reality movies that can be watched in a virtual reality headset. As this software is reactive to the head movement of a user donning a VR headset. The user will truly be immersed in a 360 degree video production.

Past technology would be that a patron would go to a movie theatre, put on 3D glasses and watch a movie in 3D. This software makes it viable that a patron could go to a movie theatre and don a virtual reality headset and watch a big budget production in true panoramic virtual reality. This software easily has at the ready applications for security and surveillance systems also. As one lens has the ability to provide 360 video feeds, encompassing a 360 degree field of view. A camera utilizing this technology could be fixed in stadiums and arenas. Big box stores or even for just home security.

I claim:

1. A process of configuring a 360 degree continuous pan virtual reality camera system wherein the new computer software process and improvement comprises a physical memory having stored thereon the present invention as machine executable code managing the electronic processes within a camera machine and computer machine or source device with one or more camera lenses, the process comprising the steps of said invention managing the electronic processes of the shutter speed of said camera lens or lenses to act at 1/7920s or faster and said invention managing the electronic processes of said camera machine which shall be mechanically equipped to be self enabled and to be rotated under its own power, if said camera machine is unable to rotate continuously under its own power it shall be connected to a mechanism to enable it to do so, thus allowing rotation of said camera machine to rotate 360 degrees panning continuously every 1 second or less until being required to stop, said machine shall be any machine with 1 or more camera lenses and have a CPU and sufficient memory to operate this software if said machine does not have a CPU and sufficient memory it shall be a peripheral of a machine that does with connectivity established by any modern means available including wireless, proximity and cable connections; with said shutter speed operating at 1/7920s or faster and said rotation speed operating at 360 degrees rotation per second or faster said camera machine shall capture 22 fps or more upon fulfilling a 360 degree rotation, the aforementioned is a process that is creating 1 viable video feed for every 1 degree increment of a 360 degree rotation.

2. The process as claimed in claim 1, further comprising the utilization of a virtual reality headset wherein the present invention stored thereon a physical memory as machine executable code manages the electronic processes of said virtual reality headset configuring said virtual reality headset to perform the functions of a television studio switcher, said television studio switcher functions would include a variety of video transitions and hybrid combinations of said video transitions that would be initiated when a user equips said virtual reality headset wherein said electronic processes are being configured by said invention, said video transitions would be initiated at the moment said user moves their head.

* * * * *